(12) United States Patent
Kelly et al.

(10) Patent No.: US 7,516,244 B2
(45) Date of Patent: Apr. 7, 2009

(54) SYSTEMS AND METHODS FOR PROVIDING SERVER OPERATIONS IN A WORK MACHINE

(75) Inventors: Thomas J. Kelly, Dunlap, IL (US);
Daniel C. Wood, East Peoria, IL (US);
Alan L. Ferguson, Peoria, IL (US); Paul W. Bierdeman, East Peoria, IL (US);
Brian L. Jenkins, East Peoria, IL (US);
Trent R. Meiss, Eureka, IL (US);
Andrew J. Swanson, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 851 days.

(21) Appl. No.: 10/646,684

(22) Filed: Aug. 25, 2003

(65) Prior Publication Data

US 2005/0021860 A1 Jan. 27, 2005

Related U.S. Application Data

(60) Provisional application No. 60/483,915, filed on Jul. 2, 2003.

(51) Int. Cl.
*G06F 15/16* (2006.01)
(52) U.S. Cl. .................. 709/249; 709/238; 709/224; 709/217; 709/218; 709/219; 709/230; 701/24; 370/401; 370/252
(58) Field of Classification Search .................. 709/223, 709/230, 249, 217–220; 701/24; 370/252, 370/401
See application file for complete search history.

(56) References Cited

U.S. PATENT DOCUMENTS 3,815,091 A 6/1974 Kirk (Continued)

FOREIGN PATENT DOCUMENTS

EP 04011261 5/2004

(Continued)

OTHER PUBLICATIONS

Carlock, M.A., "Radio to Send auto On-Board Diagnostics," IEEE Vehicular Technology Society News, vol. 42, No. 1, pp. 20-22, Feb. 1995.

(Continued)

*Primary Examiner*—Nathan J Flynn
*Assistant Examiner*—Mohammad A Siddiqi
(74) *Attorney, Agent, or Firm*—Finnegan, Henderson, Farabow, Garrett & Dunner (57) ABSTRACT

A method and system are provided to perform a process of managing communications in an environment including a mobile work machine having one or more on-board data links connected to one or more on-board modules and a gateway and including one or more off-board data links connected to one or more off-board systems and the gateway. The process is performed by the gateway and includes receiving a request generated by a source device and transmitted on a first data link. In one embodiment, the first data link may be either one of the on-board data links and one of the off-board data links. Based on the request, the gateway selectively executes a server application that performs a server process. Further, the gateway identifies a destination device associated with the request, configures the request to a format compatible with the destination device, and provides the formatted request to the destination device. Additionally, the gateway receives a response to the formatted request generated by the destination device, configures the response to a format compatible with the first data link, and sends the response to a target device over the first data link.

11 Claims, 8 Drawing Sheets

U.S. PATENT DOCUMENTS

| | | |
|---|---|---|
| 4,359,733 A | 11/1982 | O'Neill |
| 4,414,661 A | 11/1983 | Karlstrom |
| 4,583,206 A | 4/1986 | Rialan et al. |
| 4,694,408 A | 9/1987 | Zaleski |
| 4,744,083 A | 5/1988 | O'Neill et al. |
| 4,804,937 A | 2/1989 | Barbiaux et al. |
| 4,896,261 A | 1/1990 | Nolan |
| 4,924,391 A | 5/1990 | Hirano et al. |
| 4,926,331 A | 5/1990 | Windle et al. |
| 4,929,941 A | 5/1990 | Lecocq |
| 4,975,846 A | 12/1990 | Abe et al. |
| 5,003,479 A | 3/1991 | Kobayashi et al. |
| 5,025,253 A | 6/1991 | DiLullo et al. |
| 5,077,670 A | 12/1991 | Takai et al. |
| 5,090,012 A | 2/1992 | Kajiyama et al. |
| 5,132,905 A | 7/1992 | Takai et al. |
| 5,157,610 A | 10/1992 | Asano et al. |
| 5,168,272 A | 12/1992 | Akashi et al. |
| 5,218,356 A | 6/1993 | Knapp |
| 5,274,638 A | 12/1993 | Michihira et al. |
| 5,307,509 A | 4/1994 | Michalon et al. |
| 5,309,436 A | 5/1994 | Hirano et al. |
| 5,343,319 A | 8/1994 | Moore |
| 5,343,470 A | 8/1994 | Hideshima et al. |
| 5,343,472 A | 8/1994 | Michihira et al. |
| 5,365,436 A | 11/1994 | Schaller et al. |
| 5,387,994 A | 2/1995 | McCormack et al. |
| 5,400,018 A | 3/1995 | Scholl et al. |
| 5,425,051 A | 6/1995 | Mahany |
| 5,448,479 A | 9/1995 | Kemner et al. |
| 5,459,660 A | 10/1995 | Berra |
| 5,463,567 A | 10/1995 | Boen et al. |
| 5,479,157 A | 12/1995 | Suman et al. |
| 5,479,479 A | 12/1995 | Braitberg et al. |
| 5,495,469 A | 2/1996 | Halter et al. |
| 5,523,948 A | 6/1996 | Adrain |
| 5,526,357 A | 6/1996 | Jandrell |
| 5,541,840 A | 7/1996 | Gurne et al. |
| 5,555,498 A | 9/1996 | Berra et al. |
| 5,588,002 A | 12/1996 | Kawanishi et al. |
| 5,602,854 A | 2/1997 | Luse et al. |
| 5,606,556 A | 2/1997 | Kawanishi et al. |
| 5,619,412 A | 4/1997 | Hapka |
| 5,629,941 A | 5/1997 | Kawanishi et al. |
| 5,640,444 A | 6/1997 | O'Sullivan |
| 5,657,317 A | 8/1997 | Mahany et al. |
| 5,659,702 A | 8/1997 | Hashimoto et al. |
| 5,710,984 A | 1/1998 | Millar et al. |
| 5,712,782 A | 1/1998 | Weigelt et al. |
| 5,732,074 A | 3/1998 | Spaur et al. |
| 5,737,335 A | 4/1998 | Mizuta et al. |
| 5,737,711 A | 4/1998 | Abe |
| 5,764,919 A | 6/1998 | Hashimoto |
| 5,781,125 A | 7/1998 | Godau et al. |
| 5,790,536 A | 8/1998 | Mahany et al. |
| 5,790,965 A | 8/1998 | Abe |
| 5,809,432 A | 9/1998 | Yamashita |
| 5,844,953 A | 12/1998 | Heck et al. |
| 5,848,368 A | 12/1998 | Allen et al. |
| 5,856,976 A | 1/1999 | Hirano |
| 5,884,202 A | 3/1999 | Arjomand |
| 5,884,206 A | 3/1999 | Kim |
| 5,896,418 A | 4/1999 | Hamano et al. |
| 5,916,287 A | 6/1999 | Arjomand et al. |
| 5,938,716 A | 8/1999 | Shutty et al. |
| 5,949,776 A | 9/1999 | Mahany et al. |
| 5,957,985 A | 9/1999 | Wong et al. |
| 5,982,781 A | 11/1999 | Przybyla et al. |
| 5,999,876 A | 12/1999 | Irons et al. |
| 6,009,370 A | 12/1999 | Minowa et al. |
| 6,025,776 A | 2/2000 | Matsuura |
| 6,037,901 A | 3/2000 | Devier et al. |
| 6,052,632 A | 4/2000 | Iihoshi et al. |
| 6,052,788 A | 4/2000 | Wesinger et al. |
| 6,061,614 A | 5/2000 | Carrender et al. |
| 6,064,299 A | 5/2000 | Lesesky et al. |
| 6,067,302 A | 5/2000 | Tozuka |
| 6,073,063 A | 6/2000 | Leong Ong et al. |
| 6,075,451 A | 6/2000 | Lebowitz et al. |
| 6,084,870 A | 7/2000 | Wooten et al. |
| 6,104,971 A | 8/2000 | Fackler |
| 6,111,524 A | 8/2000 | Lesesky et al. |
| 6,111,893 A | 8/2000 | Volftsun et al. |
| 6,112,139 A | 8/2000 | Schubert et al. |
| 6,114,970 A | 9/2000 | Kirson et al. |
| 6,122,514 A | 9/2000 | Spaur et al. |
| 6,125,309 A | 9/2000 | Fujimoto |
| 6,131,019 A | 10/2000 | King |
| 6,134,488 A | 10/2000 | Sasaki et al. |
| 6,144,905 A | 11/2000 | Gannon |
| 6,151,298 A | 11/2000 | Bernhardsson et al. |
| 6,151,306 A | 11/2000 | Ogasawara et al. |
| 6,167,337 A | 12/2000 | Haack et al. |
| 6,169,943 B1 | 1/2001 | Simon et al. |
| 6,177,867 B1 | 1/2001 | Simon et al. |
| 6,181,994 B1 | 1/2001 | Colson et al. |
| 6,185,491 B1 | 2/2001 | Gray et al. |
| 6,189,057 B1 | 2/2001 | Schwanz et al. |
| 6,195,602 B1 | 2/2001 | Hazama et al. |
| 6,198,989 B1 | 3/2001 | Tankhilevich et al. |
| 6,201,316 B1 | 3/2001 | Knecht |
| 6,202,008 B1 | 3/2001 | Beckert et al. |
| 6,202,012 B1 | 3/2001 | Gile et al. |
| 6,225,898 B1 | 5/2001 | Kamiya et al. |
| 6,230,181 B1* | 5/2001 | Mitchell et al. ............. 718/100 |
| 6,236,909 B1 | 5/2001 | Colson et al. |
| 6,263,268 B1 | 7/2001 | Nathanson |
| 6,272,120 B1 | 8/2001 | Alexander |
| 6,275,167 B1 | 8/2001 | Dombrowski et al. |
| 6,278,921 B1 | 8/2001 | Harrison et al. |
| 6,285,925 B1 | 9/2001 | Steffen |
| 6,292,862 B1 | 9/2001 | Barrenscheen et al. |
| 6,295,492 B1 | 9/2001 | Lang et al. |
| 6,314,351 B1 | 11/2001 | Chutorash |
| 6,314,422 B1 | 11/2001 | Barker et al. |
| 6,317,838 B1 | 11/2001 | Baize |
| 6,321,142 B1 | 11/2001 | Shutty |
| 6,321,148 B1 | 11/2001 | Leung |
| 6,327,263 B1 | 12/2001 | Nakatsuji |
| 6,330,499 B1 | 12/2001 | Chou et al. |
| 6,343,249 B1 | 1/2002 | Sakai et al. |
| 6,353,776 B1 | 3/2002 | Rohrl et al. |
| 6,356,813 B1 | 3/2002 | Sommer et al. |
| 6,356,822 B1 | 3/2002 | Diaz et al. |
| 6,370,449 B1 | 4/2002 | Razavi et al. |
| 6,370,456 B1 | 4/2002 | Eiting et al. |
| 6,381,523 B2 | 4/2002 | Sone |
| 6,405,111 B2 | 6/2002 | Rogers et al. |
| 6,407,554 B1 | 6/2002 | Godau et al. |
| 6,408,232 B1 | 6/2002 | Cannon et al. |
| 6,411,203 B1 | 6/2002 | Lesesky et al. |
| 6,415,210 B2 | 7/2002 | Hozuka et al. |
| 6,427,101 B1 | 7/2002 | Diaz et al. |
| 6,430,164 B1 | 8/2002 | Jones et al. |
| 6,430,485 B1 | 8/2002 | Hullinger |
| 6,434,455 B1 | 8/2002 | Snow et al. |
| 6,434,458 B1 | 8/2002 | Laguer-Diaz et al. |
| 6,434,459 B2 | 8/2002 | Wong et al. |
| 6,438,468 B1 | 8/2002 | Muxlow et al. |
| 6,438,471 B1 | 8/2002 | Katagishi et al. |
| 6,449,884 B1 | 9/2002 | Watanabe et al. |
| 6,459,969 B1 | 10/2002 | Bates et al. |
| 6,460,096 B1 | 10/2002 | Hesse et al. |
| 6,466,861 B2 | 10/2002 | Little |

| | | | |
|---|---|---|---|
| 6,470,260 B2 | 10/2002 | Martens et al. | |
| 6,473,839 B1 | 10/2002 | Kremser et al. | |
| 6,479,792 B1 * | 11/2002 | Beiermann et al. | 219/130.5 |
| 6,480,928 B2 | 11/2002 | Yashiki et al. | |
| 6,484,082 B1 * | 11/2002 | Millsap et al. | 701/48 |
| 6,487,717 B1 | 11/2002 | Brunemann et al. | |
| 6,501,368 B1 | 12/2002 | Wiebe et al. | |
| 6,505,105 B2 | 1/2003 | Hay et al. | |
| 6,512,970 B1 | 1/2003 | Albert | |
| 6,516,192 B1 | 2/2003 | Spaur et al. | |
| 6,526,335 B1 | 2/2003 | Treyz et al. | |
| 6,526,340 B1 | 2/2003 | Reul et al. | |
| 6,526,460 B1 | 2/2003 | Dauner et al. | |
| 6,529,159 B1 * | 3/2003 | Fan et al. | 342/357.09 |
| 6,529,808 B1 | 3/2003 | Diem | |
| 6,529,812 B1 | 3/2003 | Koehrsen et al. | |
| 6,535,803 B1 | 3/2003 | Fennel | |
| 6,539,296 B2 | 3/2003 | Diaz et al. | |
| 6,542,799 B2 | 4/2003 | Mizutani et al. | |
| 6,549,833 B2 | 4/2003 | Katagishi et al. | |
| 6,553,039 B1 | 4/2003 | Huber et al. | |
| 6,553,291 B2 | 4/2003 | Matsui | |
| 6,553,292 B2 | 4/2003 | Kokes et al. | |
| 6,556,899 B1 | 4/2003 | Harvey et al. | |
| 6,560,516 B1 | 5/2003 | Baird et al. | |
| 6,560,517 B2 | 5/2003 | Matsui | |
| 6,564,127 B1 | 5/2003 | Bauerle et al. | |
| 6,567,730 B2 | 5/2003 | Tanaka | |
| 6,571,136 B1 | 5/2003 | Staiger | |
| 6,574,734 B1 | 6/2003 | Colson et al. | |
| 6,580,953 B1 | 6/2003 | Wiebe et al. | |
| 6,580,983 B2 | 6/2003 | Laguer-Diaz et al. | |
| 6,587,768 B2 | 7/2003 | Chene et al. | |
| 6,608,554 B2 | 8/2003 | Lesesky et al. | |
| 6,611,740 B2 | 8/2003 | Lowery et al. | |
| 6,625,135 B1 | 9/2003 | Johnson et al. | |
| 6,629,032 B2 | 9/2003 | Akiyama | |
| 6,636,789 B2 | 10/2003 | Bird et al. | |
| 6,647,323 B1 | 11/2003 | Robinson et al. | |
| 6,647,328 B2 * | 11/2003 | Walker | 701/36 |
| 6,654,669 B2 | 11/2003 | Goetze et al. | |
| 6,662,091 B2 | 12/2003 | Wilson et al. | |
| 6,694,235 B2 | 2/2004 | Akiyama | |
| 6,728,603 B2 | 4/2004 | Pruzan et al. | |
| 6,738,701 B2 | 5/2004 | Wilson | |
| 6,744,352 B2 | 6/2004 | Lesesky et al. | |
| 6,754,183 B1 | 6/2004 | Razavi et al. | |
| 6,778,837 B2 | 8/2004 | Bade et al. | |
| 6,865,460 B2 | 3/2005 | Bray et al. | |
| 6,901,449 B1 | 5/2005 | Selitrennikoff et al. | |
| 6,922,786 B1 | 7/2005 | Ong | |
| 6,970,127 B2 * | 11/2005 | Rakib | 341/173 |
| 6,970,459 B1 | 11/2005 | Meier | |
| 6,975,612 B1 | 12/2005 | Razavi et al. | |
| 7,020,708 B2 | 3/2006 | Nelson et al. | |
| 7,046,638 B1 | 5/2006 | Klausner et al. | |
| 7,054,319 B2 | 5/2006 | Akahane et al. | |
| 7,089,343 B2 | 8/2006 | Bähren | |
| 7,177,652 B1 | 2/2007 | Hopper et al. | |
| 7,180,908 B2 | 2/2007 | Valavi et al. | |
| 2001/0025323 A1 | 9/2001 | Sodergren | |
| 2001/0030972 A1 | 10/2001 | Donaghey | |
| 2001/0041956 A1 | 11/2001 | Wong et al. | |
| 2001/0047228 A1 | 11/2001 | Froeschl et al. | |
| 2001/0050922 A1 | 12/2001 | Tiernay et al. | |
| 2001/0051863 A1 | 12/2001 | Razavi et al. | |
| 2001/0056323 A1 | 12/2001 | Masters et al. | |
| 2002/0003781 A1 | 1/2002 | Kikkawa et al. | |
| 2002/0006139 A1 | 1/2002 | Kikkawa et al. | |
| 2002/0007237 A1 | 1/2002 | Phung et al. | |
| 2002/0019689 A1 | 2/2002 | Harrison et al. | |
| 2002/0032507 A1 | 3/2002 | Diaz et al. | |
| 2002/0032511 A1 | 3/2002 | Murakami et al. | |
| 2002/0032853 A1 | 3/2002 | Preston et al. | |
| 2002/0035429 A1 | 3/2002 | Banas | |
| 2002/0038172 A1 | 3/2002 | Kinugawa | |
| 2002/0042670 A1 | 4/2002 | Diaz et al. | |
| 2002/0069262 A1 | 6/2002 | Rigori et al. | |
| 2002/0070845 A1 | 6/2002 | Reisinger et al. | |
| 2002/0082753 A1 | 6/2002 | Guskov et al. | |
| 2002/0099487 A1 | 7/2002 | Suganuma et al. | |
| 2002/0103582 A1 | 8/2002 | Ohmura et al. | |
| 2002/0103583 A1 | 8/2002 | Ohmura et al. | |
| 2002/0105968 A1 | 8/2002 | Pruzan et al. | |
| 2002/0107624 A1 | 8/2002 | Rutz | |
| 2002/0110146 A1 | 8/2002 | Thayer et al. | |
| 2002/0116103 A1 | 8/2002 | Matsunaga et al. | |
| 2002/0116116 A1 | 8/2002 | Mathew et al. | |
| 2002/0123828 A1 | 9/2002 | Bellmann et al. | |
| 2002/0123832 A1 | 9/2002 | Gotvall et al. | |
| 2002/0123833 A1 | 9/2002 | Sakurai et al. | |
| 2002/0126632 A1 | 9/2002 | Terranova | |
| 2002/0138178 A1 | 9/2002 | Bergmann et al. | |
| 2002/0138188 A1 | 9/2002 | Watanabe et al. | |
| 2002/0150050 A1 | 10/2002 | Nathanson | |
| 2002/0154605 A1 | 10/2002 | Preston et al. | |
| 2002/0156558 A1 | 10/2002 | Hanson et al. | |
| 2002/0161495 A1 | 10/2002 | Yamaki | |
| 2002/0161496 A1 | 10/2002 | Yamaki | |
| 2002/0161820 A1 | 10/2002 | Pellegrino et al. | |
| 2002/0167965 A1 | 11/2002 | Beasley et al. | |
| 2002/0169529 A1 | 11/2002 | Kim | |
| 2002/0173889 A1 | 11/2002 | Odinak et al. | |
| 2002/0183904 A1 | 12/2002 | Sakurai et al. | |
| 2002/0193925 A1 | 12/2002 | Funkhouser et al. | |
| 2002/0196771 A1 | 12/2002 | Vij et al. | |
| 2002/0198639 A1 | 12/2002 | Ellis et al. | |
| 2003/0004624 A1 | 1/2003 | Wilson et al. | |
| 2003/0009271 A1 | 1/2003 | Akiyama | |
| 2003/0014179 A1 | 1/2003 | Szukala et al. | |
| 2003/0014521 A1 | 1/2003 | Elson et al. | |
| 2003/0016636 A1 | 1/2003 | Tari et al. | |
| 2003/0021241 A1 | 1/2003 | Dame et al. | |
| 2003/0024787 A1 | 2/2003 | Osborn et al. | |
| 2003/0028297 A1 | 2/2003 | Iihoshi et al. | |
| 2003/0028811 A1 | 2/2003 | Walker et al. | |
| 2003/0033061 A1 | 2/2003 | Chen et al. | |
| 2003/0035437 A1 | 2/2003 | Garahi et al. | |
| 2003/0037466 A1 | 2/2003 | Komatsu et al. | |
| 2003/0043739 A1 | 3/2003 | Reinold et al. | |
| 2003/0043750 A1 | 3/2003 | Remboski et al. | |
| 2003/0043779 A1 | 3/2003 | Remboski et al. | |
| 2003/0043793 A1 | 3/2003 | Reinold et al. | |
| 2003/0043799 A1 | 3/2003 | Reinold et al. | |
| 2003/0043824 A1 | 3/2003 | Remboski et al. | |
| 2003/0046327 A1 | 3/2003 | Reinold et al. | |
| 2003/0046435 A1 | 3/2003 | Lind et al. | |
| 2003/0050747 A1 | 3/2003 | Kamiya | |
| 2003/0053433 A1 | 3/2003 | Chun | |
| 2003/0060953 A1 | 3/2003 | Chen | |
| 2003/0065771 A1 | 4/2003 | Cramer et al. | |
| 2003/0069680 A1 | 4/2003 | Cohen et al. | |
| 2003/0074118 A1 | 4/2003 | Rogg et al. | |
| 2003/0088347 A1 | 5/2003 | Ames | |
| 2003/0093199 A1 | 5/2003 | Mavreas | |
| 2003/0093203 A1 | 5/2003 | Adachi et al. | |
| 2003/0093204 A1 | 5/2003 | Adachi et al. | |
| 2003/0097477 A1 | 5/2003 | Vossler | |
| 2003/0105565 A1 | 6/2003 | Loda et al. | |
| 2003/0105566 A1 | 6/2003 | Miller | |
| 2003/0114966 A1 | 6/2003 | Ferguson et al. | |
| 2003/0117298 A1 | 6/2003 | Tokunaga et al. | |
| 2003/0120395 A1 | 6/2003 | Kacel | |
| 2003/0130776 A1 | 7/2003 | Busse | |
| 2003/0167112 A1 | 9/2003 | Akiyama | |
| 2003/0182467 A1 | 9/2003 | Jensen et al. | |

| | | |
|---|---|---|
| 2003/0200017 A1 | 10/2003 | Capps et al. |
| 2004/0039500 A1 | 2/2004 | Amendola et al. |
| 2004/0052257 A1 | 3/2004 | Abdo et al. |
| 2004/0081178 A1 | 4/2004 | Fujimori |
| 2004/0111188 A1 | 6/2004 | McClure et al. |
| 2004/0158362 A1 | 8/2004 | Fuehrer et al. |
| 2004/0167690 A1 | 8/2004 | Yamada |
| 2004/0225740 A1 | 11/2004 | Klemba et al. |
| 2004/0268113 A1 | 12/2004 | Rothman et al. |
| 2005/0002354 A1 | 1/2005 | Kelley et al. |
| 2005/0002417 A1 | 1/2005 | Kelley et al. |
| 2005/0005167 A1 | 1/2005 | Kelley et al. |
| 2005/0021860 A1 | 1/2005 | Kelly et al. |
| 2005/0243779 A1 | 11/2005 | Bolz |

FOREIGN PATENT DOCUMENTS

| | | |
|---|---|---|
| WO | WO 97/36442 | 10/1997 |
| WO | 0077620 | 12/2000 |
| WO | 0126338 | 4/2001 |
| WO | 03051677 | 6/2003 |

OTHER PUBLICATIONS

Davis, Jr. P.D. et al., "Hydrometeorological Data Collection System for Lake Ontario," IEEE '71 Engineering in the Ocean Environment Conference, pp. 180-183, 1971.

Leinfelder, C. et al., "Radio Diagnostics for the ICE [electric locomotive]," Signal und Draht, vol. 89, Nos. 7-8, pp. 18-20, Jul.-Aug. 1997.

Senninger, H., "Prometheus Phase 3, Teilprojekt: On-Board Network, Schlussbericht," NTIS Journal Announcement, GRA19621, Apr. 1995.

Carlock, M.A., "Incorporation of Radio Transponders into Vehicular On-Board Diagnostic Systems," Leading Change: the Transportation Electronic Revolution: Proceedings of the 1994 International Congress on Transportation Electronics, pp. 111-114, 1994.

Katoh, T. et al., "Electronics Progress in Automotive Parts and Service Engineering," Leading Change: the Transportation Electronic Revolution: Proceedings of the 1994 International Congress on Transportation Electronics, pp. 497-502, Oct. 1994.

Mogi, T., "Prospects for Failure Diagnostics of Automotive Electronic Control Systems," Leading Change: the Transporation Electronic Revolution: Proceedings of the 1994 International Congress on Transporation Electronics, pp. 477-488, Oct. 1994.

Choe, Howard C. et al., "Neural Pattern Identification of Railroad Wheel-Bearing Faults From Audible Acoustic Signals: Comparison of FFT, CWT, and DWT Features," Proceedings SPIE—The International Society for Optical Engineering, Wavelett Applications IV, vol. 3078, pp. 480-496, Apr. 1997.

Comer, Douglas E., "Internetworking with TCP/IP Volume I," © 1995 Prentice-Hall Inc. (pp. 489-509).

Deering, S. et al., RFC 1993, "International Protocol, Version 6 (IPv6) Specification," © 1995 Network Working Group (pp. 1-37), http://www.ietf.org/rfc/rfc1883.txt.

Hagino, J. et al., RFC 3142, "An IPv6-to-IPv4 Transport Relay Translator," © 2001 The Internet Society (pp. 1-5 and 7-11), http://www.ietf.org/rfc/rfc3142.txt.

Microsoft TechNet, The Cable Guy—Apr. 2003, "Windows Peer-to-Peer Networking" (6 pages) http://web.archive.org/web/20040612130553/http://www.microsoft.com/technet/community/columns/cableguy/cg0403.mspx.

Perkins C. and Royer E., "Ad-hoc On-demand Distance Vector Routing," Feb. 1999, IEEE Conference Proceeding, pp. 90-100.

Peterson L. and Davie B., "Computer Networks: A System Approach," 2nd edition, Morgan Kaugman Publishers, Oct. 1999 pp. 284-292.

Office Action dated May 9, 2008 in U.S. Appl. No. 10/646,716 (20 pages).

Office Action dated Nov. 11, 2007 in U.S. Appl. No. 10/646,716 (12 pages).

Office Action dated Jun. 14, 2007 in U.S. Appl. No. 10/646,716 (25 pages).

Office Action dated Jun. 30, 2008 in U.S. Appl. No. 10/646,809 (12 pages).

Office Action dated Jan. 25, 2008 in U.S. Appl. No. 10/646,809 (17 pages).

Office Action dated Aug. 10, 2007 in U.S. Appl. No. 10/646,809 (15 pages).

Office Action dated Feb. 7, 2007 in U.S. Appl. No. 10/646,809 (17 pages).

Examiner's Answer dated May 16, 2008 in U.S. Appl. No. 10/646,685 (11 pages).

Office Action dated Feb. 6, 2007 in U.S. Appl. No. 10/646,685 (11 pages).

Office Action dated Jun. 28, 2006 in U.S. Appl. No. 10/646,685 (10 pages).

Office Action dated Jan. 4, 2006 in U.S. Appl. No. 10/646,685 (6 pages).

Office Action dated Apr. 18, 2005 in U.S. Appl. No. 10/646,685 (7 pages).

Office Action dated Oct. 6, 2004 in U.S. Appl. No. 10/646,685 (6 pages).

Office Action dated May 14, 2008 in U.S. Appl. No. 10/646,714 (10 pages).

Office Action dated Oct. 9, 2007 in U.S. Appl. No. 10/646,714 (11 pages).

Office Action dated Feb. 9, 2007 in U.S. Appl. No. 10/646,714 (10 pages).

Office Action dated Nov. 28, 2007 in U.S. Appl. No. 10/646,716 (18 pages).

Lind, R., et al., "The Network Vehicle - A Glimpse Into the Future of Mobile Multi-Media," Digital Avionics Systems Conference, 1998. Proceedings., 17th DASC. The AIAA/IEEE/SAE., Oct. 31 - Nov. 7, 1998, pp. I21-1 - I21-8, vol. 2, Institute of Electrical and Electronics Engineering, Bellevue, WA.

* cited by examiner

SYSTEMS AND METHODS FOR PROVIDING SERVER OPERATIONS IN A WORK MACHINE

CROSS REFERENCE TO RELATED APPLICATIONS

This application claims the benefit of U.S. Provisional Application Ser. No. 60/483,915 entitled "Systems and Methods for Interfacing Off-Board and On-Board Networks in a Work Machine," filed Jul. 2, 2003, owned by the assignee of this application and expressly incorporated herein by reference in its entirety.

This application is related to U.S. application Ser. No. 10/646,714, entitled "SYSTEMS AND METHODS FOR PROVIDING SECURITY OPERATIONS IN A WORK MACHINE," filed Aug. 25, 2003, U.S. application Ser. No. 10/646,716, entitled "SYSTEMS AND METHODS FOR PERFORMING PROTOCOL CONVERSIONS IN A MACHINE," filed Aug. 25, 2003, U.S. application Ser. No. 10/646,809, entitled "SYSTEMS AND METHODS FOR PROVIDING NETWORK COMMUNICATIONS BETWEEN WORK MACHINES," filed Aug. 25, 2003, and U.S. application Ser. No. 10/646,685, entitled "METHODS AND SYSTEMS FOR PROVIDING PROXY CONTROL FUNCTIONS IN A WORK MACHINE," filed Aug, 25, 2003, each owned by the assignee of this application and expressly incorporated herein by reference in its entirety.

TECHNICAL FIELD

This invention relates generally to network interface systems and more particularly, to systems and methods for providing gateway server operations in a work machine.

BACKGROUND

An important feature in modern work machines (e.g., fixed and mobile commercial machines, such as construction machines, fixed engine systems, marine-based machines, etc.) is the on-board electronic communications, monitoring, and control network. An on-board network includes many different modules connected to different types of communication links. These links may be proprietary and non-proprietary, such as manufacturer-based data links and communication paths based on known industry standards (e.g., J1939, RS-232, RP1210, RS-422, RS-485, MODBUS, CAN, etc.). Other features associated with work machine environments are off-board networks, such as wireless networks (e.g., cellular), satellite networks (e.g., GPS), and TCP/IP-based networks.

On-board modules may communicate with other on-board or off-board modules to perform various functions related to the operation of the work machine. For example, display modules may receive sensor data from an engine control module via a J1939 data link, while another control module connected to a proprietary data link may provide data to another module connected to the same link. Also, an on-board module may send data to an off-board system using a different communication path extending from the work machine to the off-board system.

Problems arise, however, when modules connected to different types of data links need to communicate. To address these problems, conventional systems may incorporate various interface devices to facilitate communications between different types of data links. Although this solution may be functionally acceptable in some instances, their implementations are restricted due to the hardware and service capabilities associated with the types of data links used in a work machine. Further, the additional hardware may take up valuable space needed for other components used by the machine.

One of these components is the machine's on-board computer system. Today, work machines must not only include various interface devices for facilitating communications in multi-protocol environments, but they also require the processing capabilities to service this traffic. Further, the complexity and applications of work machines require these machines to provide other types of data management services. However, work machines have limitations when accessing off-board resources to provide these services. For example, conventional machines may require information from a remote site to perform on-site operations. To obtain this information, these systems may have limited options, such as the operator contacting the remote site via wireless networks (e.g., user cellphone) and taking the machine to a site where the information may be downloaded to the machine (e.g., a diagnostic or data download center).

U.S. Pat. No. 6,202,008 to Beckert et al. addresses this problem by offering a vehicle computer system that runs a multi-tasking operating system. The system executes multiple applications including vehicle and non-vehicle related software. These applications may use a wireless link to gain access to the Internet and its resources. Also, the computer system may provide server applications to distribute data to other on-board components. Although Beckert et al. provides a solution to the afore-mentioned problems associated with external resources, it does so at the cost of additional components. That is, Beckert et al. requires three modules, i.e., a support module, a computer module, and a faceplate module, to facilitate its server capabilities. Accordingly, the system fall short of alleviating the problems of providing a on-board system that can provide data management and interface capabilities with minimal hardware and software components.

Methods, systems, and articles of manufacture consistent with certain embodiments of the present invention are directed to solving one or more of the problems set forth above.

SUMMARY OF THE INVENTION

A method is provided for managing communications in an environment including a work machine having one or more on-board data links connected to one or more on-board modules and a gateway and including one or more off-board data links connected to one or more off-board systems and the gateway. The process is performed by the gateway and includes receiving a request generated by a source device and transmitted on a first data link. In one embodiment, the first data link may be either one of the on-board data links and one of the off-board data links. Based on the request, the gateway selectively executes a server application that performs a server process. Further, the gateway identifies a destination device associated with the request, configures the request to a format compatible with the destination device, and provides the formatted request to the destination device. Additionally, the gateway receives a response to the formatted request generated by the destination device, configures the response to a format compatible with the first data link, and sends the response to a target device over the first data link.

In another embodiment, a system is provided for managing communications between one or more on-board modules connected to one or more on-board data links and one or more off-board systems connected to one or more off-board data links. The system may include a first on-board module connected to a first on-board data link, each located in a work machine. Further, the system includes a first off-board system remotely located to the work machine and connected to a first off-board data link. Also, the system includes a gateway embedded in the work machine. In one embodiment, the gateway includes first and second interface means connecting the on-board data links and off-board data links respectively to the gateway. Also, the gateway may include a server application configured to perform, when executed by a processor, a server process based on a server request received by at least one of the first on-board module and the first off-board system. Moreover, the gateway includes a communications application configured to convert a data message of a first format to a second format based on a type of data link used by the gateway to transmit the data message. Also, the gateway may be configured to selectively execute the server and communications applications based on a type of request received by the gateway from one of the first on-board module and first off-board system.

BRIEF DESCRIPTION OF THE DRAWINGS

The accompanying drawings, which are incorporated in and constitute a part of this specification, illustrate several aspects of the invention and together with the description, serve to explain the principles of the invention. In the drawings.

DETAILED DESCRIPTION

Reference will now be made in detail to the exemplary aspects of the invention, examples of which are illustrated in the accompanying drawings. Wherever possible, the same reference numbers will be used throughout the drawings to refer to the same or like parts.

Overview

Figure 1:
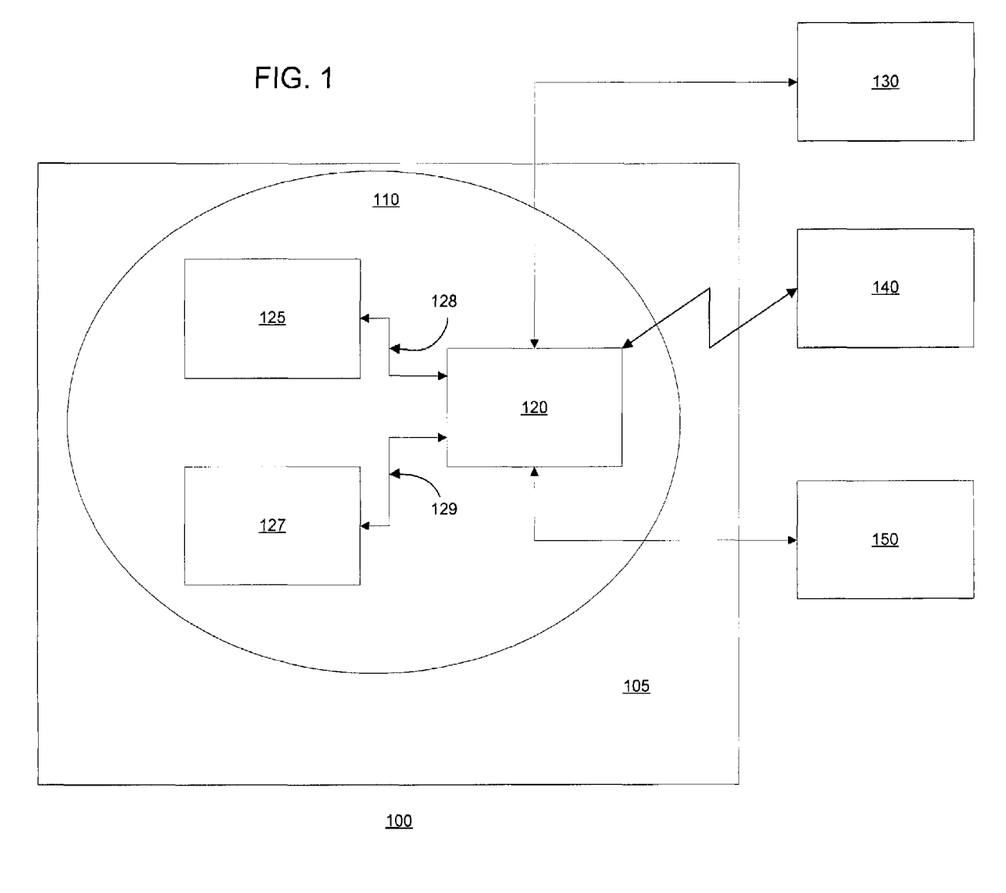
FIG. 1 illustrates a block diagram of an exemplary system that may be configured to perform certain functions consistent with embodiments of the present invention.

FIG. 1 illustrates an exemplary system 100 in which features and principles consistent with an embodiment of the present invention may be implemented. As shown in FIG. 1, system 100 may include a work machine 105 including an on-board system 110 comprising a gateway 120 and on-board modules 125, 127. System 100 may also include one or more off-board systems 130-150. Although gateway 120 is shown as a separate entity, methods and systems consistent with the present invention allow the gateway 120 to be included as a functional component of one or more of on-board modules 125 and 127.

A work machine, as the term is used herein, refers to a fixed or mobile machine that performs some type of operation associated with a particular industry, such as mining, construction, farming, etc. and operates between or within work environments (e.g., construction site, mine site, power plants, etc.). A non-limiting example of a fixed machine includes an engine system operating in a plant, off-shore environment (e.g., off-shore drilling platform). Non-limiting examples of mobile machines include commercial machines, such as trucks, cranes, earth moving vehicles, mining vehicles, backhoes, material handling equipment, farming equipment, marine vessels, aircraft, and any type of movable machine that operates in a work environment.

An on-board module, as the term is used herein, may represent any type of component operating in work machine 105 that controls or is controlled by other components or sub-components. For example, an on-board module may be an operator display device, an Engine Control Module (ECM), a power system control module, a Global Positioning System (GPS) interface device, an attachment interface that connects one or more sub-components, and any other type of device work machine 105 may use to facilitate operations of the machine during run time or non-run time conditions (i.e., machine engine running or not running, respectively).

An off-board system, as the term is used herein, may represent a system that is located remote from work machine 105. An off-board system may be a system that connects to on-board system 110 through wireline or wireless data links. Further, an off-board system may be a computer system including known computing components, such as one or more processors, software, display, and interface devices that operate collectively to perform one or more processes. Alternatively, or additionally, an off-board system may include one or more communications devices that facilitates the transmission of data to and from on-board system 110.

Gateway 120 represents one or more interface devices configured to perform functions consistent with various embodiments of the present invention. Gateway 120 may be configured with various types of hardware and software depending on its application within a work machine. Thus, in accordance with embodiments of the invention, gateway 120 may provide interface capability that facilitates the transmission of data to and from on-board system 110, performs various data processing functions, and maintains data for use by one or more on-board modules or off-board systems. For example, gateway 120 may be configured to perform protocol conversions (e.g., tunneling and translations), intelligent routing, and server-based operations, such as data provisioning, application provisioning, Web server operations, electronic mail server operations, data traffic management, and any other type of server-based operations that enable on-board system 110 to retrieve, generate, and/or provide data with on-board and/or off-board systems.

For clarity of explanation, FIG. 1 depicts gateway 120 as a distinct element. However, consistent with principles of the present invention, "gateway" functionality may be implemented via software, hardware, and/or firmware within one or more modules (e.g., 125, 127) on a network, which controls a system on a work machine and communicates with an off-board system. Thus, gateway 120 may, in certain embodiments, represent functionality or logic embedded within another element.

On-board module 125 represents one or more on-board modules connected to one or more proprietary data links 128 included in on-board system 110. On-board module 127 may be one or more on-board modules connected to a non-proprietary data link 129, such as Society of Automotive Engineers (SAE) standard data links including Controller Area Network (CAN), J1939, etc. standard data links. Data links 128 and 129 may be wireless or wireline. For example, in one embodiment, work machine 105 may include wireless sensors that are linked together through gateway 120.

As shown in FIG. 1, gateway 120 also interfaces with one or more off-board systems 130-150. In one exemplary embodiment, off-board systems 130-150 include, for example, computer system 130, computer system 140, and service port system 150.

Computer system 130 represents one or more computing systems each executing one or more software applications. For example, computer system 130 may be a workstation, personal digital assistant, laptop, mainframe, etc. Computer system 130 may include Web browser software that requests and receives data from a server when executed by a processor and displays content to a user operating the system. In one embodiment of the invention, computer system 130 is connected to on-board system 110 through one or more wireline based data links, such as a Local Area Network (LAN), an Extranet, and the Internet using an Ethernet connection based on TCP/IP.

Computer system 140 also represents one or more computing systems each executing one or more software applications. Computer system 140 may be a workstation, personal digital assistant, laptop, mainframe, etc. Also, computer system 140 may include Web browser software that requests and receives data from a server when executed by a processor and displays content to a user operating the system. In one embodiment of the invention, computer system 140 is connected to on-board system 110 through one or more wireless based data links, such as cellular, satellite, and radio-based communication data links.

Computer systems 130 and 140 may each be associated with a user (e.g., customer), multiple users, a business entity (dealer, manufacturer, vendor, etc.), a department of a business entity (e.g., service center, operations support center, logistics center, etc.), and any other type of entity that sends and/or receives information to/from on-board system 110. Further, computer system 130 and 140 may each execute off-board software applications that download or upload information to/from on-board system 110 via gateway 120.

In certain embodiments, computer systems 130 and 140 may include one or more controllers, such as Programmable Logic Controllers (PLCs) that may be used in plants and/or factories.

Service system 150 represent one or more portable, or fixed, service systems that perform diagnostics and/or service operations that include receiving and sending messages to on-board system 110 via gateway 120. For example, service port system 150 may be a electronic testing device that connects to on-board system 120 through an RS-232 serial data link. Using service port system 150, a user or an application executed by a processor may perform diagnostics and service operations on any of on-board system modules 125, 127 through gateway 120.

Figure 2:
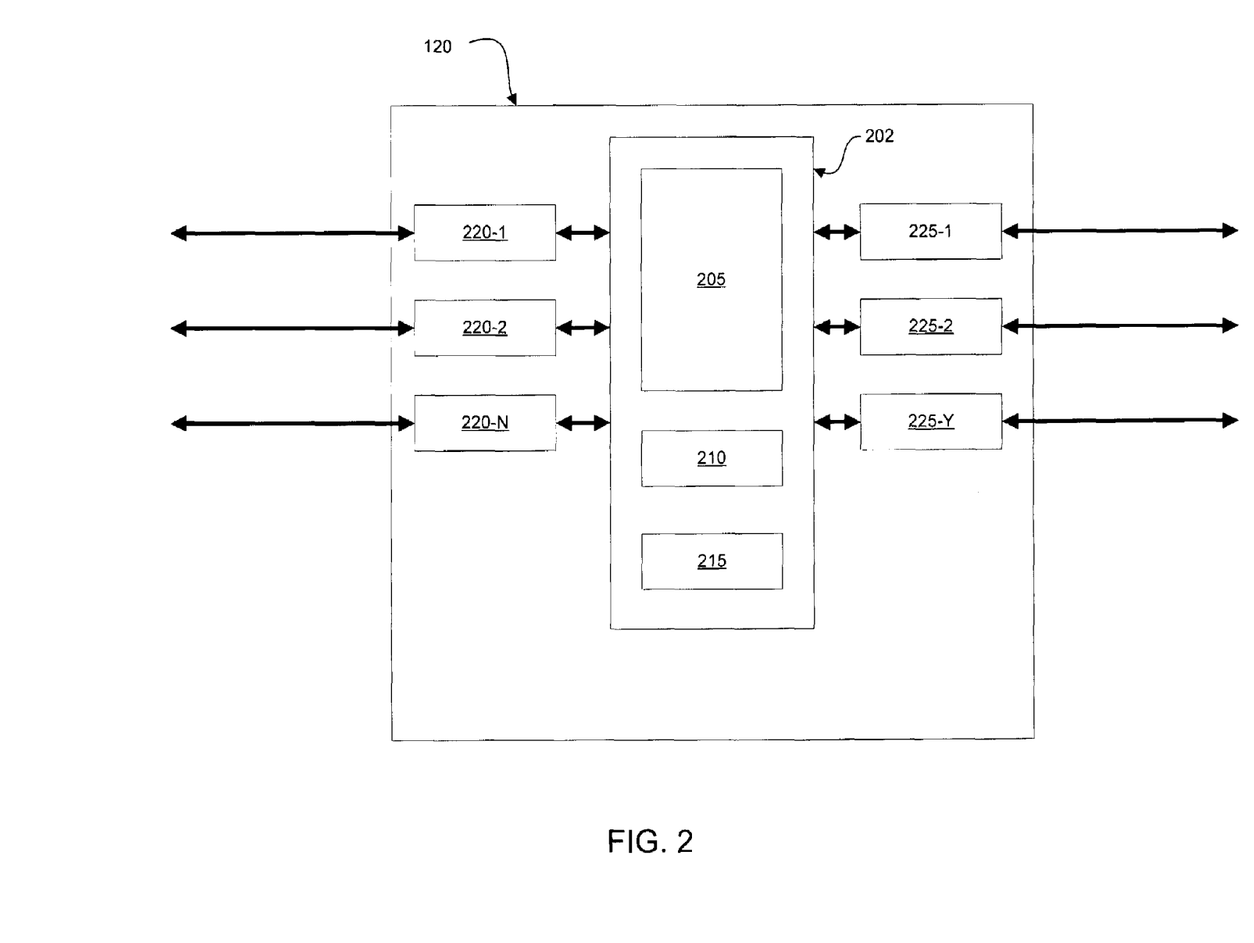
FIG. 2 illustrates a block diagram of an exemplary gateway consistent with embodiments of the present invention.

In one embodiment, gateway 120 may include various computing components used to perform server based services (e.g., communications services, file services, database services, etc.) for on-board system 110. FIG. 2 shows an exemplary block diagram of gateway 120 consistent with embodiments of the present invention. As shown, gateway 120 includes a digital core 202, on-board data link port components 220-1 to 220-N, and off-board data link port components 225-1 to 225-Y.

Digital core 202 includes the logic and processing components used by gateway 120 to perform its interface, communications, and server functionalities. In one embodiment, digital core 202 includes one or more processors 205 and internal memories 210 and 215. Processor 205 may represent one or more microprocessors that execute software to perform the gateway features of the present invention. Memory 210 may represent one or more memory devices that temporarily store data, instructions, and executable code, or any combination thereof, used by processor 205. Memory 215 may represent one or more memory devices that store data temporarily during operation of gateway 120, such as a cache memory, register devices, buffers, queuing memory devices, and any type of memory device that maintains information. Memories 210 and 215 may be any type of memory device, such as flash memory, Static Random Access Memory (SRAM), and battery backed non-volatile memory devices.

On-board data link ports 220-1 to 220-N represent one or more interface devices that interconnect one or more on-board data links with digital core 202. For example, on-board data link ports 220-1 to 220-N may connect to proprietary and non-proprietary data links 128, 129, respectively. In one embodiment, on-board data link ports 220-1 to 220-N interfaces with one or more proprietary data links, one or more CAN data links (e.g., J1939, galvanized isolated CAN data links, etc.), one or more RS-232 serial based data links (e.g., MODBUS, PPP, NMEA183, etc.), and one or more RS-242 data links. On-board data link ports 220-1 to 220-N may also include virtual (i.e., software) ports that allow a single connection to act as if there were multiple connections.

Off-board data link ports 225-1 to 225-Y represent one or more interface devices that interconnect one or more off-board data links with digital core 202. For example, off-board data link ports 225-1 to 225-Y may connect gateway 120 to one or more RS-232 data links, RS-485 data links, Ethernet data links, MODBUS data links, radio data links, and/or satellite data links, etc. It is appreciated that gateway 120 may be configured to interface with any type of data link used in an on-board or off-board system network.

The gateway 120 shown in FIG. 2 is exemplary and not intended to be limiting. A number of additional components may be included in gateway 120 that supplement and/or compliment the operations of digital core 202 and data link ports 220 and 225. For example, gateway 120 may also include an internal power supply, a real time clock, hour meter, sensor inputs for receiving signals from one or more sensors monitoring the operations of a work machine component, memory arrays, etc. Moreover, as explained, gateway 120 may, in certain embodiments, be implemented (e.g., via logic and/or circuitry) within one or more modules coupled to a given network.

Figure 3:
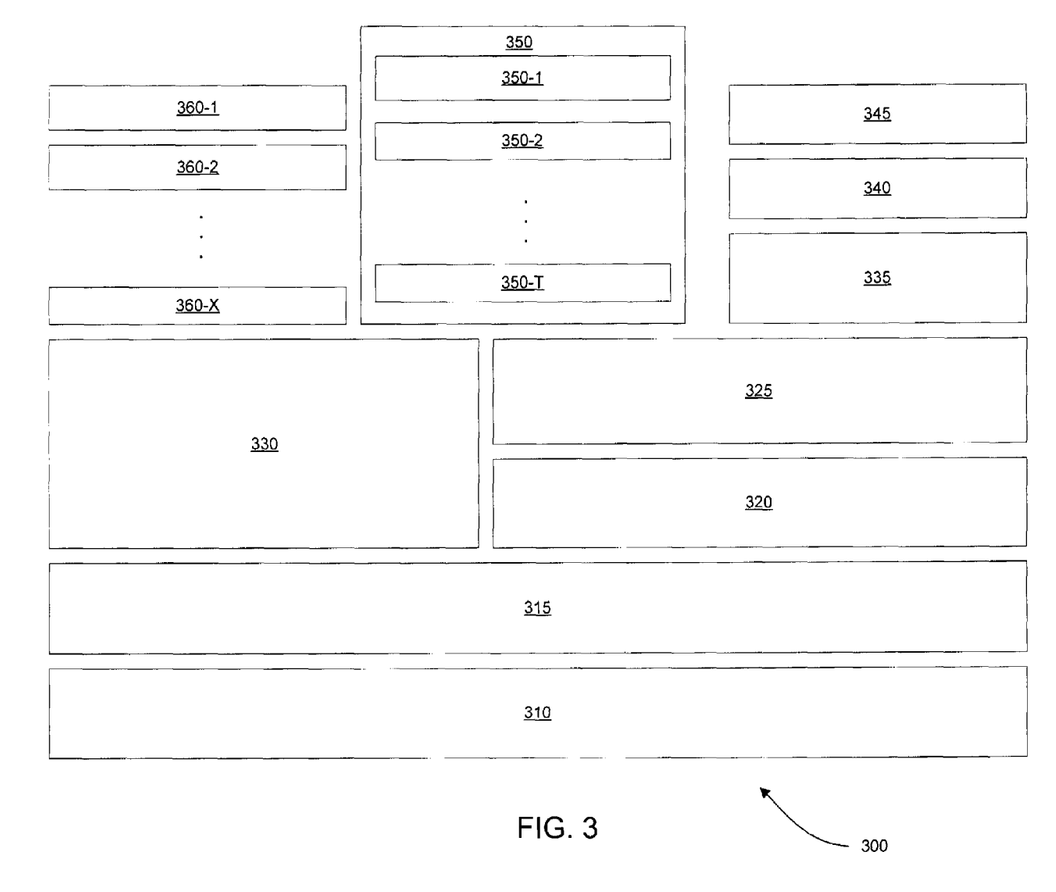
FIG. 3 illustrates a block diagram of an exemplary software architecture for a gateway consistent with embodiments of the present invention.

In operation, digital core 202 executes program code to facilitate communications between on-board modules and/or off-board systems. In one embodiment of the present invention, memory 210 includes application and server-based software programs that allow information received through either data link ports 220 and 225 to be processed and/or transferred to the proper destination module/system in the proper format. FIG. 3 illustrates an exemplary software architecture model 300 that may be implemented by gateway 120 consistent with embodiments of the present invention.

Exemplary model 300 may include hardware interface software, such as boot executable software and driver software layer 310, that drive the on-board and off-board data link ports 220 and 225 connecting the multiple types of data links to gateway 120 (e.g., Ethernet, RS-232, CAN, proprietary data links, etc.). A core hardware access layer 315 interfaces boot executable layer 310 and core software layer 330, which includes software associated with runtime operations of gateway 120. Layer 320 includes operating system software executed by processor 205, and layer 325 is a network stack level including one or more protocol stacks used to perform communication services, such as formatting data messages for specific protocols, etc. In one embodiment, model 300 may also include a Web server layer 335 that includes server software used by gateway 120 to perform Web server operations, such as HTML processing, content generation, Web page request processing, etc. Further, model 300 may also include one or more layers 340-360 representing application programs executable by gateway 120. For example, layers 340, 345 may represent server applications executed by gateway 120 to perform certain services, such as data provisioning, application management, traffic management, etc. Layers 360-1 to 360-X may represent application programs that perform operations associated with functions typically performed by certain types of on-board modules connected to an on-board network, such as a Customer Communication Module (CCM), a communication adapter, a GPS Interface Module (GPSIM), a third party interface software, an Engine Vision Interface Module (EVIM), and a product link module.

Model 300 may also include an inter-data link gateway layer 350 that includes one or more gateway applications 350-1 to 350-T, that perform protocol conversion operations for converting information associated with one type of data link to another. The conversion operations may include protocol translation and tunneling features. Processor 205 may execute a selected one of application programs 350-1 to 350-T based on the type of format required by an outgoing data link. For example, application layer 350-1 may represent a protocol conversion program that allows data messages received in a proprietary data link to be converted to a J1939 format for transmission across a J1939 data link. Other types of conversion applications may be configured in model 300 including application layers that combine one or more protocol conversion capabilities.

Embedded Server Applications

Figure 4:
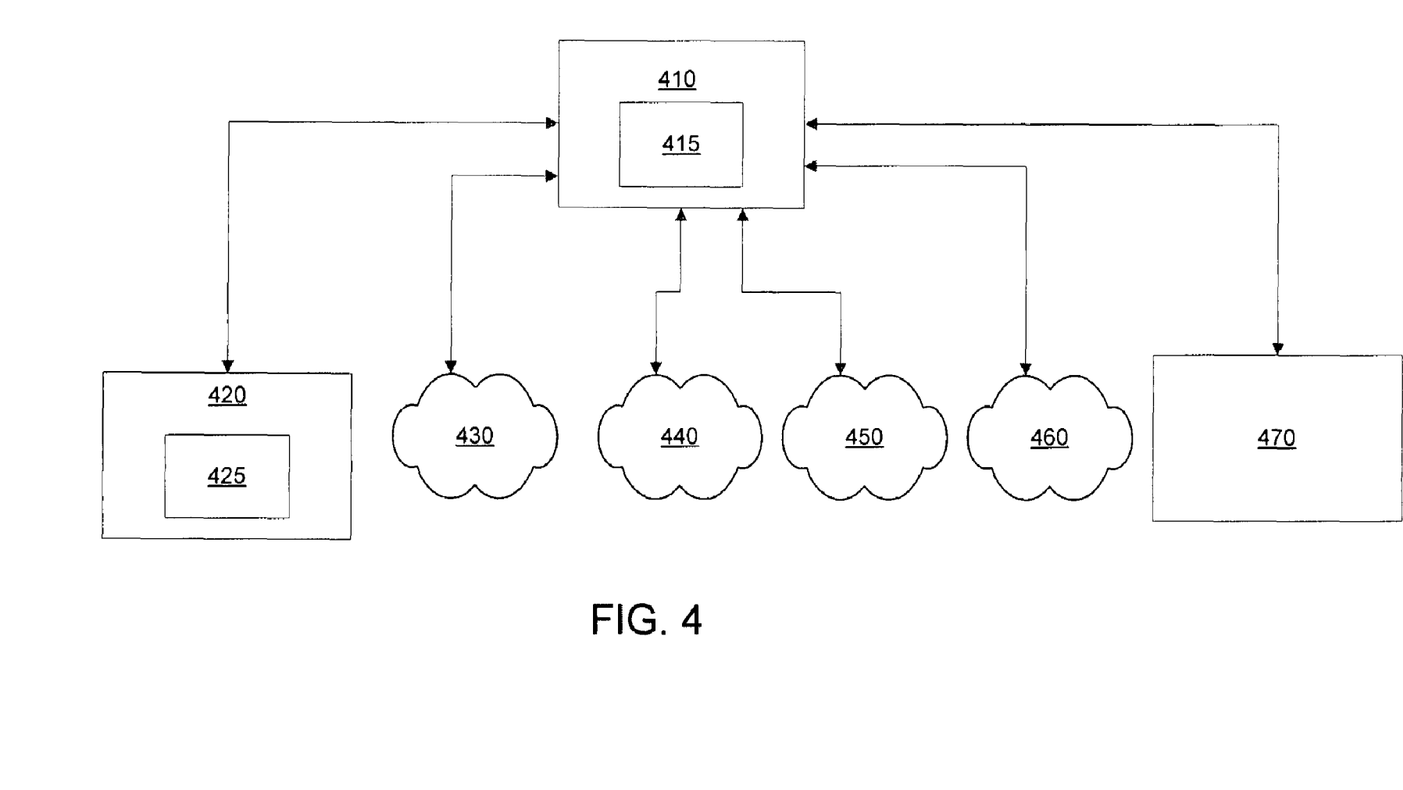
FIG. 4 illustrates a block diagram of an exemplary off-board server configuration consistent with embodiments of the present invention.

Methods and systems consistent with embodiments of the present invention may include one or more work machines that each include one or more gateways 120 that operate as an embedded server. In these embodiments, gateway 120 includes hardware and software that enable it to operate in a server-like fashion, receiving requests for information and servicing those requests. Alternatively, one or more on-board modules may include gateway logic and/or software that perform functions similar to those of gateway 120. Gateway 120 may also operate as a Web server and execute application software (e.g., communication applications) during runtime operations to ensure the work machine receives and sends information in appropriate formats and to proper destinations. When embedded in a mobile work machine, gateway 120 may operate as a mobile server in manner by dynamically servicing requests from off-board systems. FIG. 4 illustrates a block diagram showing an exemplary off-board server environment consistent with embodiments of the present invention.

As shown in FIG. 4, a mobile work machine 410 including a gateway 415, which may be configured, and operates, similarly to gateway 120 described in connection with FIGS. 1 and 2. Gateway 415 may execute one or more server applications that allow work machine 410 to communicate with one or more off-board elements, such as another work machine 420, a Wide Area Satellite Wireless Network (WASWN) 430, a Wireless Local Area Network (WLAN) 440, a Wide-Area Terrestrial Wireless Network (WATWLN) 450, a Wide-Area Network (WAN) 460, and one or more external systems 470.

Work machine 420 may include a gateway 425 that may be configured, and operates, similar to gateway 120. Work machine 420 may be a mobile or fixed work machine connected to work machine 410 through a wireline or wireless data link. WASWN 430 may be a satellite radio network that includes infrastructure allowing communications between one or more satellite devices and a remote system, such as computer system 140 described in connection with FIG. 1. WLAN may be a wireless radio network including infrastructure that facilitates communications between one or more wireless radio devices and a remote system, such as computer system 140. WATWLN 450 may be a wireless network that includes infrastructure allowing communications between one or more cellular devices and a remote system (e.g., computer system 140). WAN 460 may be a network including the infrastructure that allows for Internet access, such as the World Wide Web. External system 470 may represent a remote system that communicates with gateway 415 through a wireless or wireline connection, such as computer system 130, computer system 140, or service port system 150.

Although FIG. 4 shows work machine 420 and external system 470 connected to work machine 410 through dedicated data links, these elements may also be configured to communicate with gateway 415 through one or more of networks 430, 440, 450, and 470.

Figure 5:
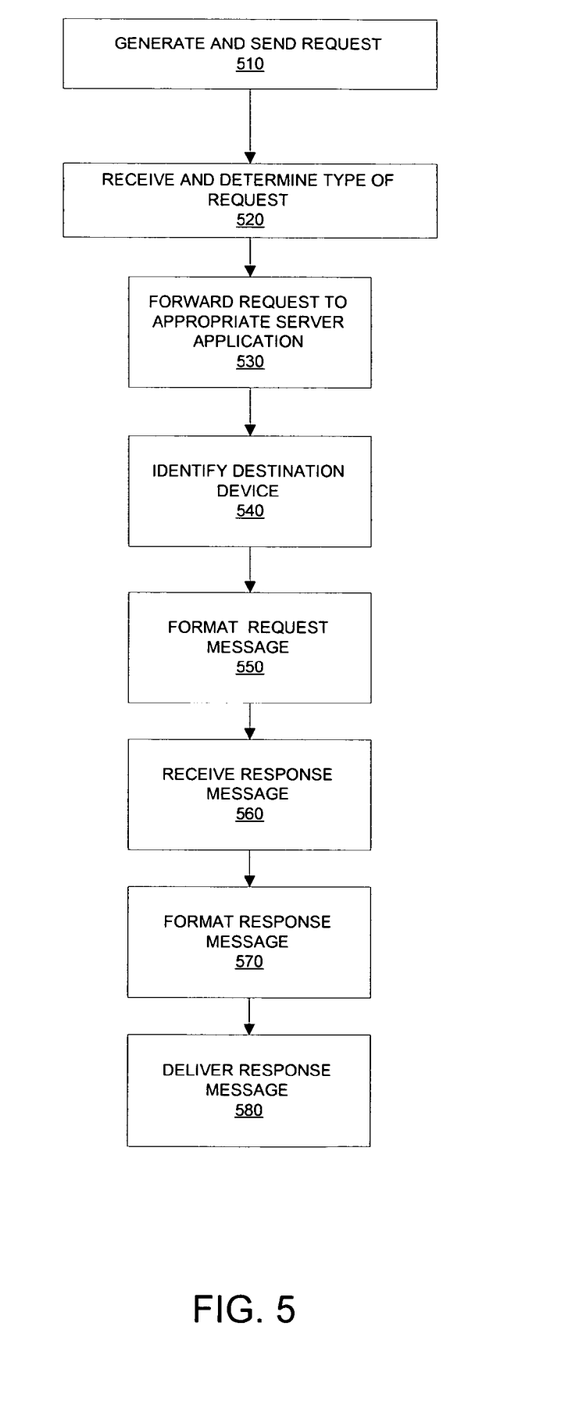
FIG. 5 illustrates a flowchart of an exemplary off-board server process consistent with embodiments of the present invention.

As an embedded server, gateway 415 may receive requests from any of the off-board elements shown in FIG. 4. FIG. 5 illustrates a flowchart of an exemplary off-board server process consistent with embodiments of the present invention. At step 510, a source device generates and sends a server request to gateway 415. The source device may be an off-board system communicating with any of the networks 430-460, work machine 420, or external system 470. Accordingly, the data link used to send the request depends on the type of source device and the data link used by the device to communicate with gateway 415.

At step 520, gateway 415 receives the request through the appropriate data link port (e.g., data link port 225-1 to 225-Y) and determines the type of request. The server request may be any type of request for information or services accessible or performed by gateway 415. For example, the server request may be a request for data stored in an internal memory (e.g., memory 215) of gateway 415. Alternatively, the server request may be a request for information stored in an on-board module included in an on-board system of work machine 410 (e.g., on-board module 125 or 127). Further, the server request may be a request to push information to gateway 425 of work machine 420 for delivery to a component within gateway 425 or elsewhere within machine 420 or to an on-board module within work machine 410. As can be appreciated, gateway 415 may receive many different types of server requests based on the source device generating the request and the information or services requested.

Based on the type of request received, gateway 415 passes the request to an appropriate server application that is configured to process the request (Step 530). For example, a request for information may be handled by a file or database server application, while a request for setting the work machine in a particular mode of operation (e.g., calibration mode) may be handled by another type of server application. Moreover, a request for passing data to a destination device may be handled by a communication server application that leverages one or more of inter-data link gateway applications 350 executed by gateway 415.

Once the proper server application receives the request, gateway 415 identifies the destination device associated with the type of request (Step 540). For example, a server request including instructions for collecting engine operations data may require information stored in an ECM included in the on-board system of work machine 410. Accordingly, the server application processing the request may identify the ECM as the destination device. However, if the server request is for information maintained by a memory device or program operating within gateway 415, the server application may identify the memory device or program as the destination device. Thus, a destination device may be a physical component operating within gateway 415 or work machine 410 or a software process executed by gateway 415.

In addition to identifying the destination device, the server application may also facilitate the conversion of the request to a format compatible with the destination device (Step 550). For example, a request for engine operations data from an ECM connected to a J1939 data link requires J1939 protocol to be used in transmitting the request. Accordingly, if necessary, the server application may use a protocol conversion application (e.g., inter-data link gateway applications 350-1 to 350-T) to convert the request message to J1939 format for transmission to the destination ECM. Alternatively, if the destination device is local to gateway 415, the server application handling the request may format the request to facilitate access to this local device.

Once the request message is formatted, or prior to formatting the request, in one embodiment, the server application may provide one or more commands that instruct the destination device to perform a selected process based on the type of server request received from the source device. For example, the server application may add instructions to the formatted server request specific to the destination device in accordance with the type of server request received.

Once the request is formatted and prepared, gateway 415 may send the request message to the destination device using on-board data link ports, using 220-1 to 220-N. The destination device may process the received request based on, for example, instructions included in the request provided by the server application. Alternatively, the destination device may be configured to process the received server request based on information provided by the source device. Once processed, the destination device may generate results (e.g., collected data from a memory, processed status data, processed sensor data, etc.). The destination device may then generate a response message including the results and send the message to gateway 415 in accordance with the protocol compatible with the data link connecting the destination device to gateway 415 (Step 560). In one embodiment, the response message may be a status message including information reflecting the status of the request, such as the availability of the destination device, successful downloads, acknowledgements, non-acknowledgments, etc. Alternatively, the response message includes the results of the processing performed based on the type of server request provided by the server application initially handling the request.

Gateway 415 may process the received response message and forward the results included therein to the appropriate server application responsible for processing the response message. The server application may be the same or a different server application that processed the request provided to the destination device. The server application may then process the results included and configure the response message to a format compatible with the data link used by the source device that provided the server request (Step 570). In one embodiment, the server application may leverage one or more of the inter-data link applications to configure the results into a response message compatible with the source device connecting data link. Gateway 415 may then use its communication software and hardware to deliver the message (Step 580).

In one embodiment, gateway 415 may deliver the response message to the source device over the same data link initially used by the source device. Alternatively, gateway 415 may deliver the response message to an off-board device over a different data link than that used by the source device providing the request. This may occur when the server request includes instructions to forward the response message to another off-board element based on the type of response data included in the response message. For example, gateway 415 may be configured with a server application that collects operations data from an on-board module, analyzes the data, and autonomously delivers the data, or a generated response message based on the data, to, for example, a third party off-board system.

Accordingly, gateway 415 may be configured with one or more server applications that process server requests based on the type of request and the information collected from a destination device. This allows work machine 410 to process server requests while stationed at, or if mobile, moving between, physical locations. Depending on the communication availability and capabilities of the data links interfacing gateway 415 (wireless or wireline), work machine 410 may provide network services to many different types of off-board systems. Further, the off-board server process may skip one or more of the steps described in connection with FIGS. 4 and 5 if gateway 415 determines they are unnecessary. For example, if a server request includes instructions to download information to a destination device (e.g., a memory location within or external to gateway 415), gateway 415 may not receive a response message that requires delivery. On the other hand, the destination device may be configured to provide an acknowledgement response message indicating the success or failure of the destination device downloading the information requested in the server request.

Figure 6:
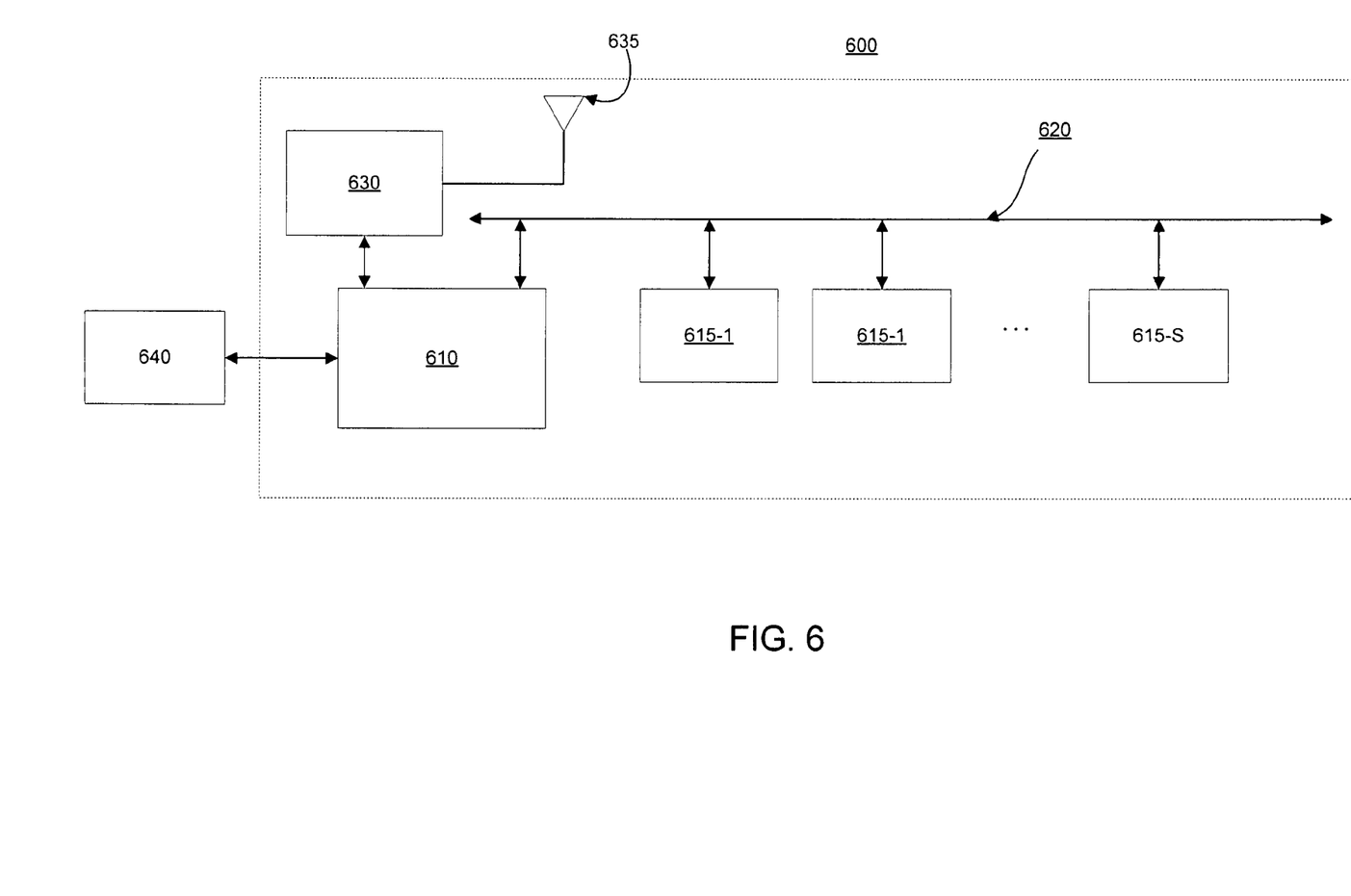
FIG. 6 illustrates a block diagram of an exemplary on-board server configuration consistent with embodiments of the present invention.

Although the off-board server process of FIGS. 4 and 5 describes a communication session initiated from an off-board source device, methods and systems consistent with embodiments of the present invention may perform similar processes when handling a request initiated by an on-board source device. FIG. 6 illustrates a block diagram of an on-board system 600 associated with a work machine 605 consistent with certain embodiments of the present invention. As shown, work machine 605 includes a gateway 610 that is similar in configuration and operation as gateway 120 described above in connection with FIGS. 1 and 2. Further, work machine 605 includes one or more on-board modules 615-1 to 615-S connected to one or more data links 620. Modules 615-1 to 615-S may be any type of on-board module, component, or sub-component operating within work machine 605 and connected to one or more proprietary and/or non-proprietary data links. For example, modules 615-1 to 615-S may be ECMs, J1939 display devices (e.g., sensor gauges, etc.), EVIMs, on-board diagnostic systems, etc. Data links 620 may be one or more proprietary and/or non-proprietary data links similar to data links 128 and 129 described in connection with FIG. 1. Also, gateway 610 may be connected to one or more radio/modem interface devices 630 that transmits and receives information through one or more radio antennae 635 to one or more off-board devices, such as off-board computer system 140 described in connection with FIG. 1. Further, an off-board system 640 may also be connected to gateway 610 through an interface port (e.g., off-board data link ports 225-1 to 225-Y). In one embodiment, off-board system 640 may be a service interface system, similar to service port system 150 described in connection with FIG. 1.

Figure 7:
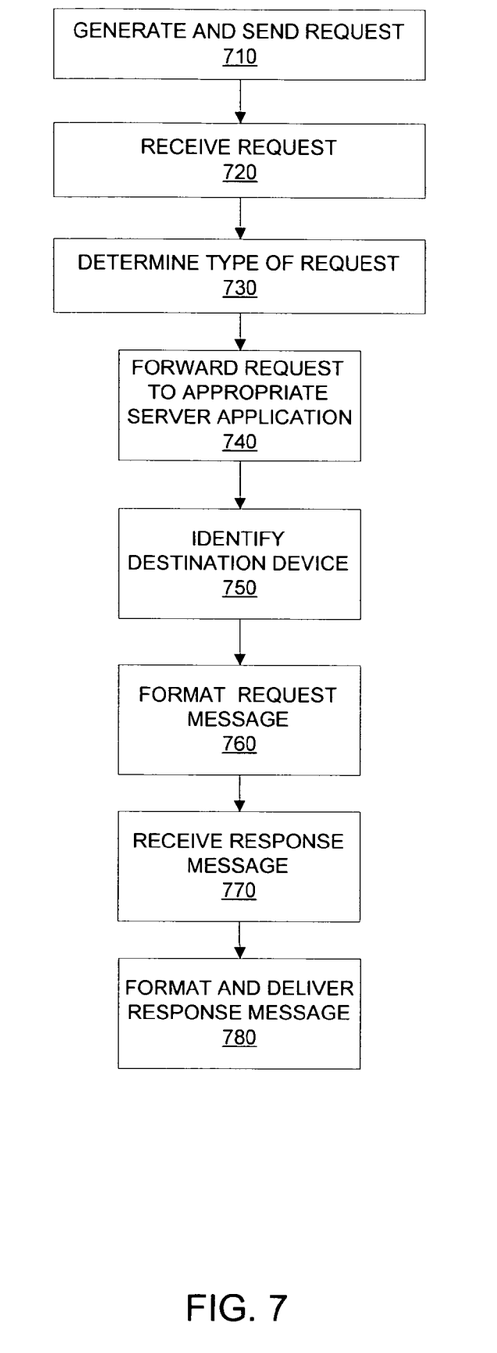
FIG. 7 illustrates a flowchart of an exemplary on-board server process consistent with embodiments of the present invention.

FIG. 7 illustrates a flowchart of an on-board server request process consistent with embodiments of the present invention. At step 710, an on-board source device (e.g., module 615-1) may generate and send a server request to gateway 610 over data link 620. Gateway 610 receives the request (Step 720) and determines the type of server request based on information included in the request message (Step 730). Based on the type of server request message, gateway 610 may forward the request to an appropriate server application that is configured to process the type of server request identified in Step 730 (Step 740). Accordingly, gateway 610 provides the request message to a server application that is running on the gateway device. The server application may extract the appropriate information from the request and processes the request to identify the destination device (e.g., on-board modules 615-1 to 615-S or an off-board system) for the request (Step 750). Based on the type of data link used by the identified destination device, the server application formats and sends the request to conform to the appropriate protocol used by the data link (e.g., proprietary, J1939, RS-232, etc.) (Step 760). As with the off-board server process, the server application processing an on-board server request may also include instructions that facilitate the processing of the request by the destination device. Further, the server application may leverage one or more of the inter-data link applications to format the server request in accordance with an appropriate protocol.

The destination device (e.g., on-board module 615-2, gateway process executed by the digital core 202, etc.) receives and processes the server request (step 770) and may generate and send a response message to gateway 610 (Step 780). Gateway 610 may then deliver the response message including the results of the processed server request to the appropriate entity, such as the source device.

The on-board server process may skip one or more of the steps described in connection with FIG. 7 if gateway 610 determines they are unnecessary. For example, if a server request includes instructions to download information to a destination device (e.g., a memory location within or external to gateway 610), gateway 610 may not receive a response message that requires delivery. On the other hand, the destination device may be configured to provide an acknowledgement response message indicating the success or failure of the destination device downloading the information requested in the server request.

Embedded Web Server Applications

As described, a gateway configured in accordance with embodiments of the present invention may operate as a mobile server that manages and processes server requests from on-board and off-board systems. In addition to standard server capabilities, gateway 120 may be configured with a Web server application that generates and maintains one or more Web pages. The Web page may be an Hyper Text Markup Language (HTML) document that includes content reflecting various operating characteristics associated with the operations of the work machine hosting gateway 120. Further, gateway 120 may use Hyper-Text Markup Language (HTML)-based technologies, such as extensible Markup Language (XML), for creating, rendering, and/or providing content. These operating characteristics may include Parameter Identification information (PIDs) associated with one or more work machine parameters, such as engine speed, temperature data, exhaust information, etc. These parameters may be included in one or more translation tables that are included in the inter-data link gateway applications 350 to convert information from a first protocol to a second protocol (e.g., proprietary data link to J1939, J1939 to Ethernet, etc.). Additionally, the characteristic information may include gateway performance information, such as software and/or hardware status information, state data, etc. Further, the Web page may include statistics and description information associated with one or more on-board components and modules operating within a work machine. Moreover, the Web page may include non-work machine characteristic information, such as hyperlinks to other Web pages maintained by remote Web servers, work machine manufacturing data maintained by a remote database system, etc. Also, the content included in the Web page may include configuration data associated with gateway 120's set-up.

Figure 8:
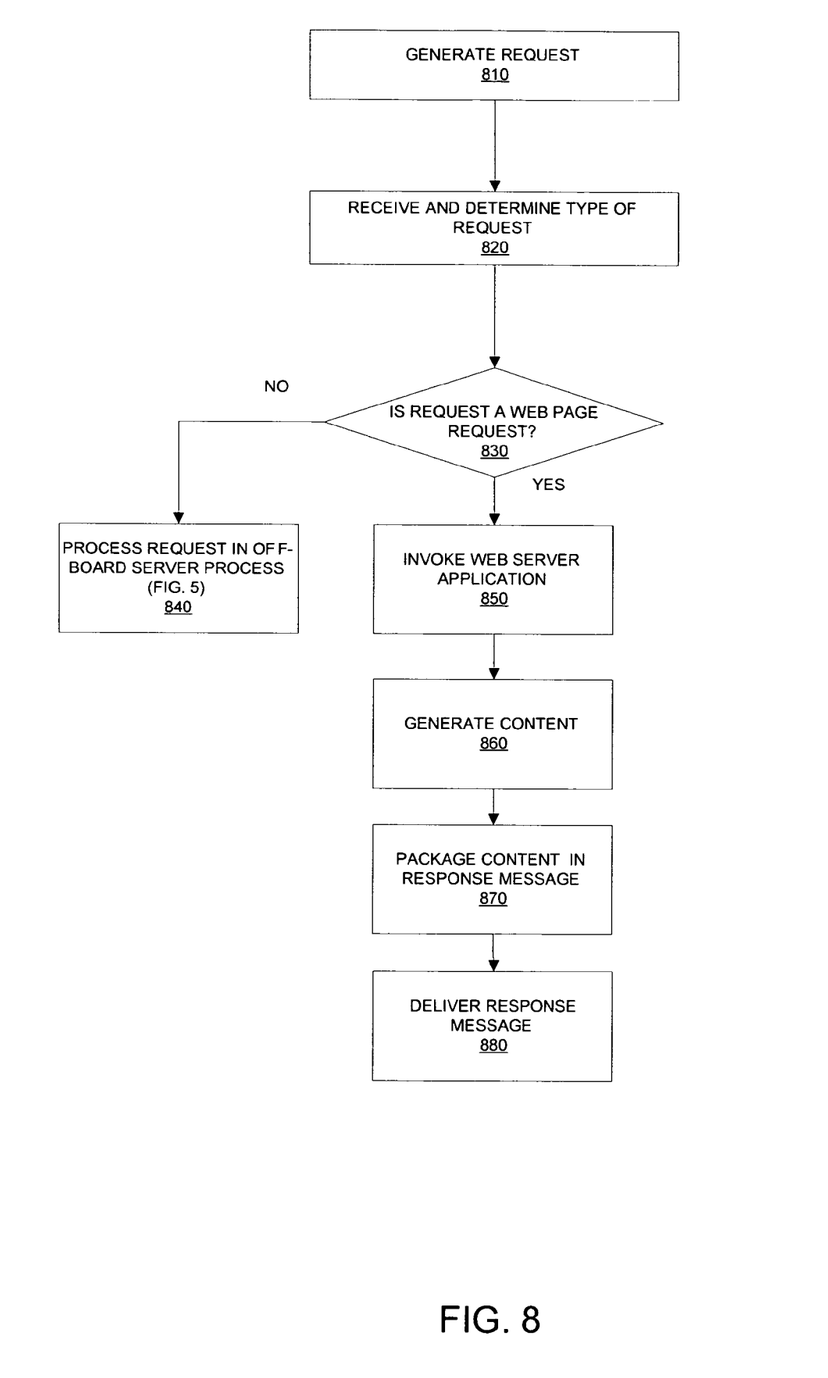
FIG. 8 illustrates a flowchart of an exemplary Web server process consistent with embodiments of the present invention.

FIG. 8 illustrates a flowchart of an exemplary Web server process consistent with certain embodiments of the present invention. For exemplary purposes, the system shown in FIG. 1 will be referenced to describe the Web server process. The Web server process may begin when an off-board computer system (e.g., computer system 130 or computer system 140) requests access to the Web page maintained by gateway 120 (Step 810). The server request may be initiated or facilitated by Web browser software executing at the off-board computer system. Gateway 120 may receive and determine the type of request received in a manner similar to Step 520 of FIG. 5 (Step 820). If gateway 120 determines that the request is not a Web page request (Step 830-NO), the request is processed in a manner similar to the off-board server process described in connection with FIG. 5 (e.g., Steps 530-580) (Step 840). On the other hand, if the server request is a Web page access request (Step 830-YES), gateway 120 may invoke a Web server application to process the request (Step 850). In one embodiment, the Web page server application may access and render the Web page including content associated with the type of request provided by the off-board computer system (Step 860). Gateway 120 may then package the content into a response message compatible with the protocol used to communicate with the requesting off-board computer system, such as TCP/IP, HTTP, etc. (Step 870). At Step 880, gateway 120 delivers the response message to the off-board computer system where the content is rendered by the system's Web browser as a Web page.

In addition to providing access by off-board systems to the Web page, gateway 120 may update the content in the Web page based on information provided by one or more on-board modules 125, 127 or an off-board system 130, 140. For example, gateway 120 may be configured to receive requested, or non-solicited, data messages from one or more on-board modules (e.g., modules 125, 127) or off-board systems (e.g., systems 130, 140) including information associated with the respective modules or any sub-components controlled, monitored, or maintained by the module. Further, gateway 120 may receive sensor signal data from one or more sensors that are connected to gateway 120. The received information or data signal data may be extracted from a request message for updating the Web page content by the Web server application. The application may use the extracted information to modify the content of the Web page, such as updating data values, modifying parameter information, status information, and system configuration information, etc. Accordingly, an off-board system, user, etc. may retrieve updated work machine related information over the Internet that is automatically updated by gateway 120.

INDUSTRIAL APPLICABILITY

Methods and systems consistent with embodiments of the present invention allow work machines to operate as servers for managing data and network services for one or more networks consisting of fixed and/or mobile work machines, on-board modules, and/or off-board systems. In one embodiment, a work machine configured with a gateway 120 including server applications may operate as a network server that manages traffic and information requests between multiple work machines operating within a site location (e.g., a mining site, a construction site, etc.).

In a wireless application, the embedded server work machine may receive server requests from remote entities for on-board operations data associated with the work machine. Alternatively, or additionally, the embedded server work machine may process server requests for operations data associated with other mobile work machines that push their on-board information to the embedded server work machine autonomously or in response to user commands.

In a wireline application, an embedded work machine may be linked to an external computer system, such as an external testing device, a client computer system (e.g., CCM computer), etc., to provide server based services to the computer system. For example, the embedded work machine may be docked at a service location where external diagnosis equipment is connected to one or more off-board interface ports of gateway 120 and pushes or retrieves information from the machine's on-board system.

In another embodiment, a work machine may perform Web server application services for remote entities requesting on-board system information associated with the work machine. For example, the Web server application executed by the gateway 120 may render content for a user located remotely from work machine 105. Accordingly, the user may access a Web page maintained local to work machine 105 via the Internet to retrieve on-board information. Also, a user may use a Web-compatible cellular telephone device or PDA to access the on-board Web page. In one embodiment, the user may be a customer (e.g., work site manager, service center, etc.) who wishes to monitor the operations of a work machine. Accordingly, the work machine's Web server application may maintain one or more Web pages including content reflecting engine performance information, PID information, configuration data, error logs, real, or near real, time performance data, sensor values, etc. Accessing the Web page, a user may view the work machine's performance data. Further, a user may download content for the Web page, such as new HTML content, data values, hyperlinks, updated PID codes, etc.

In another embodiment, multiple work machines embedded with gateway 120s may be configured to operate as a distributed server. In this configuration, two or more work machines may share resources, such as memory, software programs, data values, etc., to provide distributed server applications to one or more clients (e.g., other work machines, off-board computer systems 130, 140, etc.). The distributed server gateways may use each work machine's software resources to manage the flow of information between a network of client work machines and/or off-board computer systems. Thus, as a mobile work machine travels between and/or within a work environment, client machines may uses the services of a remotely located server work machine while it is currently unavailable to that client machine. For example, a client work machine operating in a work environment and embedded with a gateway 120 may require information or services from a first remote server work machine embedded with a gateway 120. However, in the event the server work machine is positioned in a location beyond the communication capabilities of work environment network or client machine, a second server work machine located within these communication capabilities may be accessed. Accordingly, the second server work machine may perform server processes that enable the client's server request to be either processed locally (due to data sharing) or forwarded to the first server work machine using communication devices and processes capable of forwarding the request.

Also, gateway 120 may include messaging applications that enable a user, or gateway 120 software processes, to send, receive, and generate electronic mail messages. Accordingly, a work machine embedded with a gateway configured in this manner may provide electronic mail services for on-board components and off-board systems. For example, gateway 120 may be configured to monitor on-board component operations through on-board modules 125, 127 and/or sensors directly connected to gateway 120. Based on the monitored threshold values, gateway 120 may generate status or alert messages that are formulated in electronic mail form and delivered to predetermined destination devices, such as computer systems 130 and 140. Therefore, users or remote application programs may receive electronic messages from work machine 105 that include operations data, user messages, alert messages, etc. associated with the operations, status, and/or performance of work machine 105.

In another embodiment, gateway 120 may be configured with application programs that perform configuration processes that typically are performed individually by multiple on-board modules via individual commands. For example, a service technician may wish to evaluate work machine 105 under certain state and machine component settings, such as a calibration mode. In such a mode, certain engine components and hardware and software components are to be set at predetermined states or operating parameters. Conventional systems may require each of the components to be individually instructed to configure themselves accordingly. Gateway 120, however, may be configured with software that automatically instructs and manages the configuration of these multiple components to set up the calibration mode for work machine 105. Other types of autonomous operations may be managed by gateway 120, while still providing communication conversion, interfacing, and data routing functions for on-board system 110.

In another embodiment, gateway 120 may be configured with software that allows it to evaluate data messages received from on-board or off-board data links to make decisions regarding how to route messages. For example, gateway 120 may execute a communication application that interprets information included in a received data message (e.g., header data) and determines a destination device for the information based one or more intelligent routing algorithms or processes. Accordingly, a work machine having multiple wireless data link ports to multiple wireless data links (e.g., radio, satellite, etc.) may route a data message based on a function optimization process that considers communication characteristic information, such as the cost of sending the message over one data link as opposed to another, the priority of the message, the speed by which delivery should be completed, quality of service parameters, signal strength, availability of network services or components, bandwidth requirements, GPS location, topologies, etc. Based on these characteristics, gateway 120 may select, transform, and send the data message over an appropriate data link.

The embodiments, features, aspects, and principles of the present invention may be implemented in various environments and are not limited to work site environments. For example, a work machine with an embedded gateway may perform the functions described herein in other environments, such as mobile environments between job sites, geographical locations, and settings. Further, the processes disclosed herein are not inherently related to any particular system and may be implemented by a suitable combination of electrical-based components. Other embodiments of the invention will be apparent to those skilled in the art from consideration of the specification and practice of the invention disclosed herein. It is intended that the specification and examples be considered as exemplary only, with a true scope of the invention being indicated by the following claims.

What is claimed is:

1. A communication system comprising:
    an off-board computer; and
    a first work machine, comprising:
        an on-board data link;
        an on-board control module connected to the on-board data link, the on-board control module monitoring a value of a first parameter information data code of a mechanical system on-board the first work machine, and generating a first message containing the value of the first parameter information data code; and
        an on-board gateway embedded in the work machine, comprising:
            a first interface for connecting to the on-board data link;
            a second interface for connecting to an off-board data link;
            a server application configured to receive the first message from the on-board module via the on-board data link, to communicate with a second work machine via the off-board data link to receive a second message containing a value of a second parameter information data code of a mechanical system on-board the second work machine, and to communicate with the off-board computer;
            a communications application configured to convert formats of the first and second messages for communication to the off-board computer, based on types of data links used to transmit the first and second messages; and
            a Web server application configured to generate work machine performance data based on the converted first message or on the converted second message, and to provide a Web page containing the work machine performance data, the work machine performance data including the value of the first parameter information data code or the value of the second parameter information data code,
        the off-board computer being configured to communicate with the gateway, via the server application, to access the Web page containing the work machine performance data, and the gateway selectively executing the server, communication, and Web server applications based on a type of request received by the gateway from the on-board control module or from the off-board computer.

2. The system of claim 1, wherein the first interface includes a plurality of on-board data link ports connected to on-board data links.

3. The system of claim 2, wherein the second interface includes a plurality of off-board data link ports connected to off-board data links.

4. The system of claim 1, wherein the off-board data link is an Ethernet data link, an SAE standard serial data link, a wireless radio data link, or a wireless satellite data link.

5. The system of claim 1, wherein the on-board data link is a proprietary data link or an SAE standard serial data link.

6. The system of claim 1, wherein the gateway is software embedded in an on-board module that controls one or more components of the first work machine.

7. A method for managing communications in an environment including a first work machine having an on-board data link connected to an on-board control module, an on-board gateway, and an off-board data link connected to an off-board computer and to the gateway, the method comprising:
    monitoring, by the on-board control module, a value of a first parameter information data code of a mechanical system on-board of the first work machine;
    generating, by the on-board control module, a first message containing the value of the first parameter information data code;
    selectively executing, by the gateway, a server application to:
        receive the first message from the on-board control module via the on-board data link,
        communicate with a second work machine, via the off-board data link, to receive a second message containing a value of a second parameter information data code of a mechanical system on-board the second work machine, and
        communicate with the off-board computer;
    selectively executing, by the gateway, a communications application to convert formats of the first and second messages for communication to the off-board computer based on types of data links used to transmit the first and second messages;
    selectively executing, by the gateway, a Web server application that generates work machine performance data based on the converted first message or on the converted second message, and that provides a Web page containing the work machine performance data, the work machine performance data including the value of the first parameter information data code or the value of the second parameter information data code;
    providing to the off-board computer, by the server application, access to the Web page containing the work machine performance data,
    the server application, the communication application, and the Web server application being selectively executed based on a type of request received from the on-board control module or from the off-board computer.

8. The method of claim 7, wherein the first message is converted based on a type of the on-board data link, and the second message is converted based on a type of the off-board data link.

9. The method of claim 7, wherein the off-board data link is an Ethernet data link, an SAE standard serial data link, a wireless radio data link, or a wireless satellite data link.

10. The method of claim 7, wherein the on-board data link is a proprietary data link or an SAE standard serial data link.

11. The method of claim 7, wherein the server application leverages a communication application to convert the formats of the first and second messages.

* * * * *